US009116911B2

(12) United States Patent
Broussard et al.

(10) Patent No.: US 9,116,911 B2
(45) Date of Patent: Aug. 25, 2015

(54) REMOTE FILE SHARING BASED ON CONTENT FILTERING

(75) Inventors: Scott J. Broussard, Cedar Park, TX (US); Eduardo N. Spring, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/938,365

(22) Filed: Nov. 2, 2010

(65) Prior Publication Data

US 2012/0109987 A1   May 3, 2012

(51) Int. Cl.
G06F 7/00 (2006.01)
G06F 17/30 (2006.01)

(52) U.S. Cl.
CPC .... G06F 17/30165 (2013.01); G06F 17/30029 (2013.01)

(58) Field of Classification Search
CPC .................................................. G06F 17/30029
USPC ........................................................ 707/754
See application file for complete search history.

(56) References Cited

U.S. PATENT DOCUMENTS

| 5,495,603 | A  | * | 2/1996  | Fruchtman et al. ........... 707/694 |
| 7,779,097 | B2 |   | 8/2010  | Lamkin et al. |
| 2003/0046366 | A1 | * | 3/2003 | Pardikar et al. ............... 709/219 |
| 2005/0192966 | A1 | * | 9/2005 | Hilbert et al. ................... 707/10 |
| 2006/0026679 | A1 | * | 2/2006 | Zakas ............................. 726/22 |
| 2006/0168136 | A1 | * | 7/2006 | Bethlehem et al. ........... 709/219 |
| 2007/0288247 | A1 |   | 12/2007 | Mackay |
| 2008/0222734 | A1 |   | 9/2008  | Redlich et al. |
| 2008/0288301 | A1 |   | 11/2008 | Emling et al. |
| 2008/0294674 | A1 | * | 11/2008 | Reztlaff et al. ............... 707/102 |
| 2009/0254422 | A1 |   | 10/2009 | Jenkins et al. |
| 2010/0274784 | A1 | * | 10/2010 | Acharya ........................ 707/736 |

FOREIGN PATENT DOCUMENTS

| CN | 101252585 A | 8/2008 |
| JP | 2004178334 A | 6/2004 |

* cited by examiner

Primary Examiner — Ajith Jacob
(74) Attorney, Agent, or Firm — Sughrue Mion, PLLC

(57) ABSTRACT

Embodiments of the invention include a system, method and computer program product for accessing a remote file system in which files in the remote file system are mapped to a local file system that is coupled to the remote file system by a network, wherein the mapped files meet a filtering criterion and are used in subsequent file operations at the local file system.

22 Claims, 10 Drawing Sheets

REMOTE FILE SHARING BASED ON CONTENT FILTERING

BACKGROUND

Embodiments of the invention relate generally to computer file systems, and more particularly to accessing files in another computer system based on content filtering.

Computers are commonly interconnected in a network for user communications, exchanging data, or retrieving data as in a client-server configuration. In a networked computing environment, a user may need to access data files stored on another computer that is connected to the user's computer by a network in an operation called file sharing. The files may be in a shared file system operating at the remote computer. There are various commonly used file systems such as Distributed File System (DFS) and Global Storage Architecture (GSA). In order to access the shared files, the user often initiates a process referred to as drive mapping which associates the remote file structure with an unused local drive designation at the user's local computer. The user and applications running on local computer can then perform file operations on the mapped remote files as if the files reside in a data storage drive at the local computer.

In Windows™ operating systems that commonly operate on personal computers, a user may initiate the drive mapping using system options such as "Map Network Drive", a command "net use", or the like. (Windows is a trademark of Microsoft Corporation in the United States, other countries, or both.) In Unix® type operating systems, a drive mapping may be set up with the command "mount" or the like. (UNIX is a registered trademark of The Open Group in the United States and other countries.) File operations on the mapped drive, however, can be slow, especially when network bandwidth is limited and the shared file system contains a large number of folders and files. For example, a file search (e.g. Google desktop search) must iterate all the files and essentially read all the data from the files in the mapped drive that are sent to the client machine through the network. The file search operation is then performed on the returned files in the local disk to find the files that match the search expression.

BRIEF SUMMARY

Embodiments of the invention include a system, method and computer program product for accessing a remote file system in which files in the remote file system are mapped to a local file system that is coupled to the remote file system by a network, wherein the mapped files meet a filtering criterion and are used in subsequent file operations at the local file system.

The details of the embodiments, both as to their structure and operation, are described below in the Detailed Description section in reference to the accompanying drawings. The Brief Summary is intended to identify key features of the claimed subject matter, but it is not intended to be used to limit the scope of the claimed subject matter.

DETAILED DESCRIPTION

Embodiments of the invention relate to accessing a remote file system by mapping files in the remote file system to a local drive wherein the mapped files meet certain filtering criteria and performing subsequent file operations on the mapped files.

Figure 1:
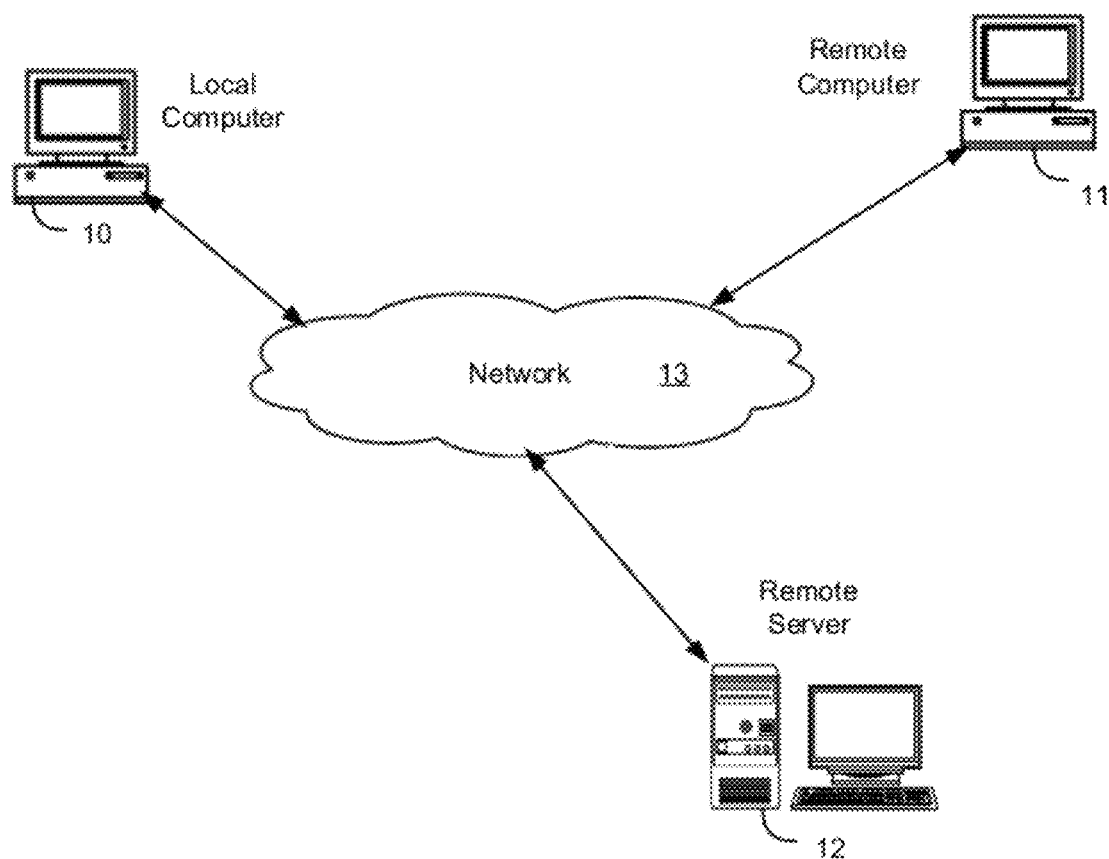
FIG. 1 illustrates a computing environment supporting file sharing in which aspects of the invention may be implemented, according to an exemplary embodiment.

Referring now to the drawings and in particular to FIG. 1, there is illustrated an example of a computing environment in which aspects of the invention may be implemented. The computing configuration in FIG. 1 is presented only by way of example and is not intended to be limiting. The file access systems and methods disclosed herein may be applicable to a wide variety of different computers, servers, storage systems, and network architectures, in addition to the configuration in FIG. 1. The illustrated configuration may comprise multiple computers 10-12 that are interconnected by a computer network 13. The computer network 13 may be a wide area network (WAN), a local area network (LAN), a private intranet, or the Internet. The computers 10-12 may include a server 12 that executes various programs and provides a variety of computing functions to client computers 10-11. Remote computers 11-12 may have data files in their file systems that local computer 10 may need to access. A file system may maintain the data files in a data storage system that is attached to a server computer 12 by a storage network or similar means.

Figure 2:
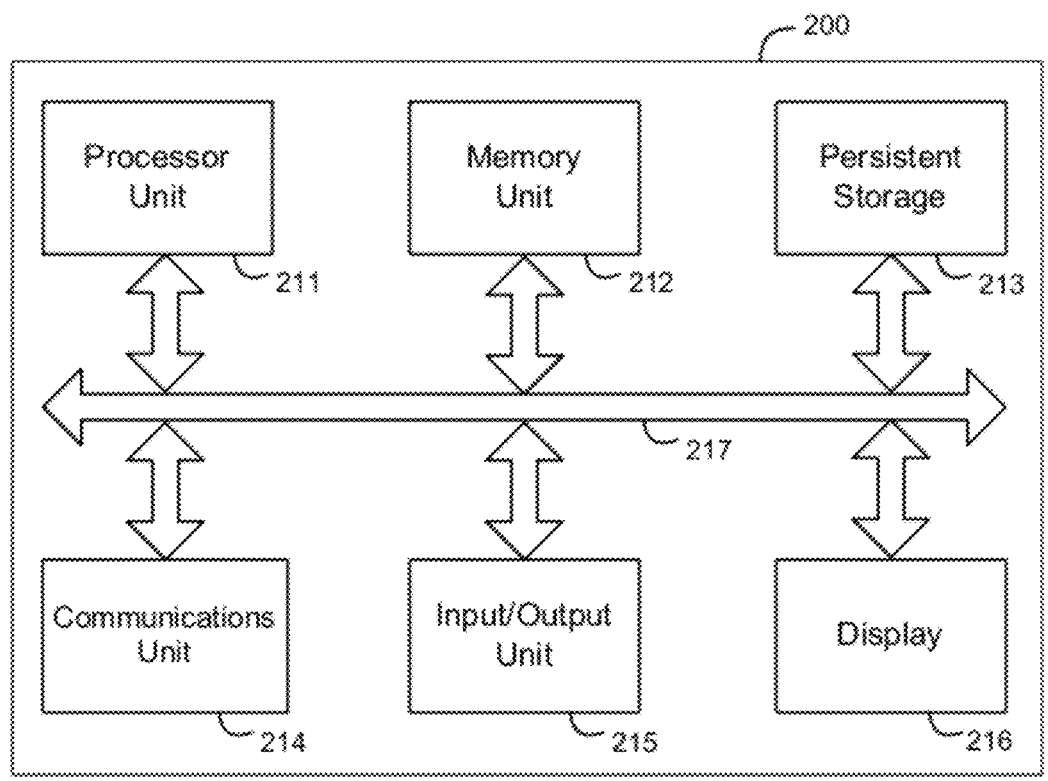
FIG. 2 illustrates a block diagram of a computer system that may be used for file sharing and providing aspects of the invention, according to an exemplary embodiment.

FIG. 2 is a block diagram of a computer system that may be used in the computing environment of FIG. 1 for providing aspects of the invention. Data processing system 210 includes a processor unit 211, a memory unit 212, a persistent storage 213, a communications unit 214, an input/output unit 215, a display 216 and a system bus 217. Computer programs are typically stored in persistent storage 213 until they are needed for execution by an operating system (not shown) running in memory unit 212. At that time, the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 2116 interface with each other through the system bus 217.

File Systems

File systems allow users and application programs to access data stored on storage devices in a logical way without being concerned with how data is actually stored on the storage devices. The data units that the storage devices use to store data may vary depending on the device type and data format of the device, e.g., disks, tapes, solid state memories, etc. Application programs may request data in units of bytes, data entities, or data files. The file systems then map the program address spaces to the storage device address spaces and access data stored in the storage spaces at the device data addresses.

Figure 3:
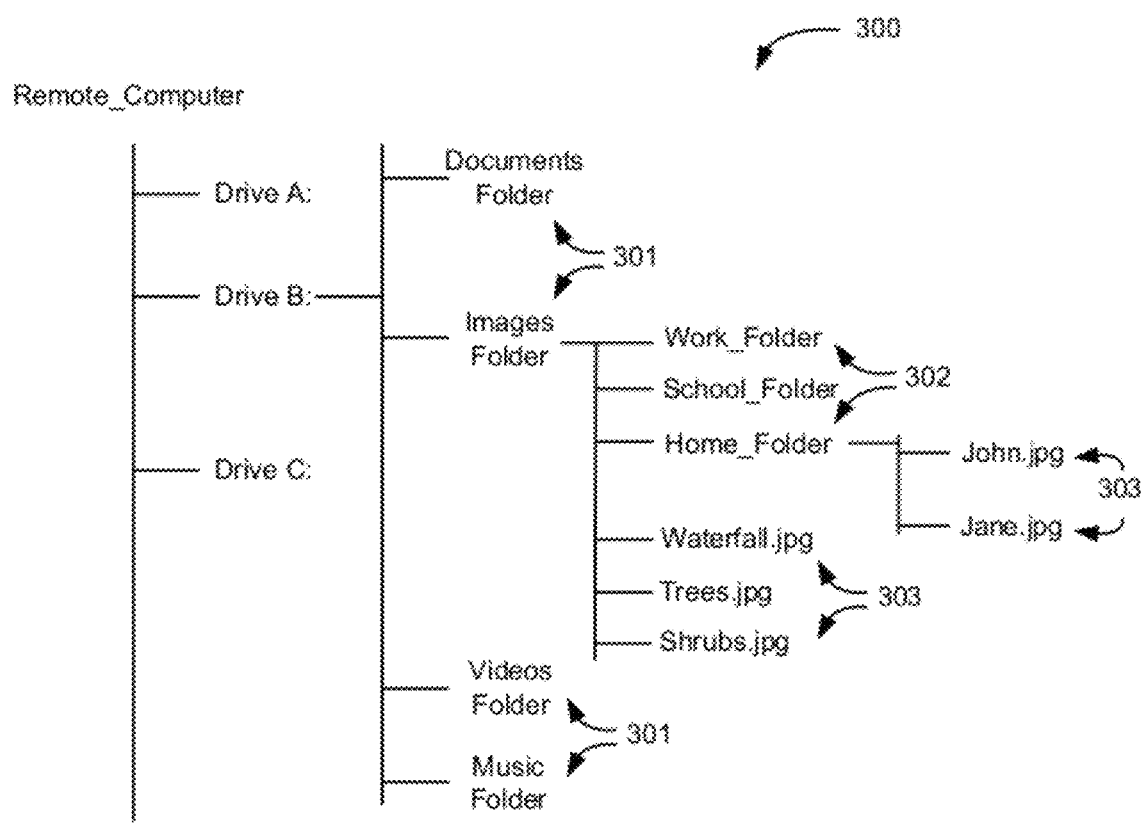
FIG. 3 illustrates an example of a file tree structure having files and folders that may be drive mapped, according to an embodiment of the invention.

Data on storage devices may be organized as volumes, directories or folders, depending on file structures and naming conventions supported by the operating systems. Volumes, directories and folders may further have data files. For example, a folder may include other lower-level folders. File systems may present files to application programs through directory files that form a tree-like hierarchy of files and directories that contain more files. File names are unique to directories but not to file folders or volumes. FIG. 3 illustrates an example of a file tree structure 300 that includes multiple file folders 301. Each folder 301 may have additional folders 302 and files 303. Although exemplary embodiments of the invention are described using file systems having files and folders, the embodiments are applicable to other forms of file systems and not limited to just file systems that include files and folders. In addition to traditional file systems, the embodiments may be applicable to other forms of data collections such as removable file systems, abstracted file systems, RAM disks, databases, and other data organizations.

A traditional file sharing system is based on user permission or roles. As long as the user has access permission to a file system, all the files and folders in the file system that the user has permission to access may be mapped to a user local drive and available to the user. In such as system, access to files or folders is granted to certain roles or groups, and all the users in the same role or group have the same access rights. For instance, if a file system has ten folders, a "Viewers" role or group may be granted "read" permission to five of the ten folders. Subsequently, when a user in the "Viewers" group maps files in the file sharing system, these five folders are available to be mapped to the user's local system.

The above type of file sharing may impact system performance and response time as the file sharing system may send all the available files and folders to a user regardless of whether the files and folders relate to what the user is interested in. Embodiments of the invention improve file sharing performance through content filtering during a network drive mapping. Only the file folders and files in a network file system that meet certain user filtering criteria, and thus may be of the user's interest, are mapped to the user's local drive.

In the above "Viewers" group example, a content filter may further limit the available folders to two folders that are of interest to the user, rather than original five file folders. Such as content filtering improves overall performance as it results in a smaller number of files being transferred to the user across the network. Subsequent file operations may be performed only on the filtered set of two file folders rather than on all the five file folders which the user has permission to access in the remote file system.

Figure 4:
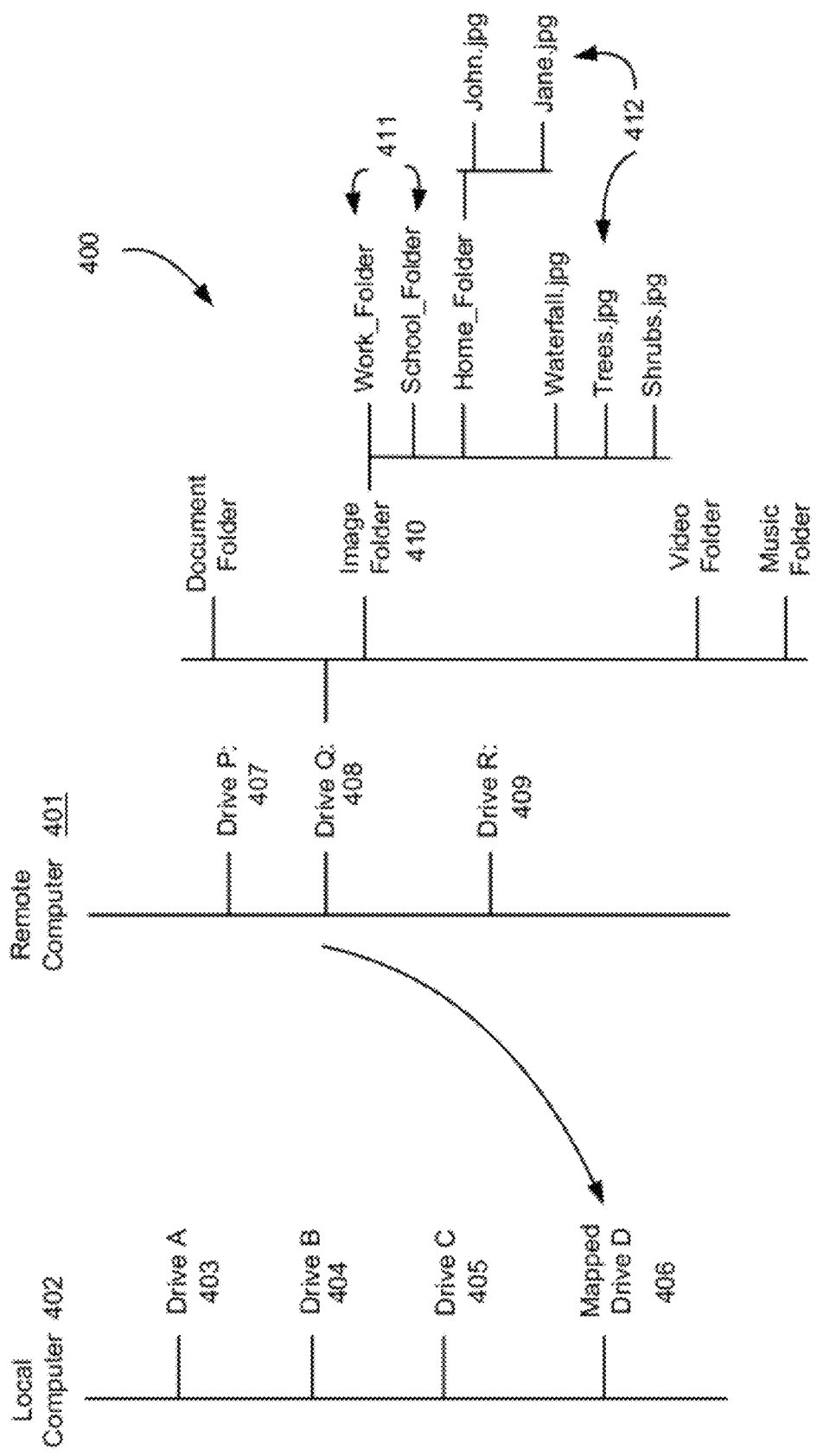
FIG. 4 illustrates an example of a file sharing operation in which a file structure on a remote computer is mapped to a local drive.

FIG. 4 illustrates an example of a drive mapping in which a file structure 400 on a remote computer 401 is mapped to a drive on a local computer 402. In this example, a local computer 402 may have four storage drives A, B, C and D, where drive D (406) is a mapped drive associated with the remote file structure 400. As an example, the file structure 400 includes files 412 and folders 411 in the "Images" folder 410, which is on drive Q (408) of the remote computer 401. In addition to drive Q (408), the remote computer 401 may have drives P (407) and drive R (409) which are not involved in the drive mapping.

Once the operating system (not shown) of the local computer 402 has mapped the remote file structure 400 to the local drive D (406), users and application programs of the local computer 402 may access folders 411 and files 412 in the remote file structure 400 as if they currently reside on the local drive D (406). In a drive mapping operation, the folders 411 and files 412 still remain in the file structure 400 at the remote computer 401 and are only sent to the local computer 402 when the user or a program at the local computer 402 accesses them.

A user may initiate the file sharing illustrated in FIG. 4 using a "net use" command (or similar commands) in a Windows™ based computer system or a "mount" command (or similar commands) in a Unix® based computer system. The user may perform the drive map operation through command line or through a graphical user interface (GUI). For instance, to map a drive in Windows™, the user may issue a command "net use z: \\blah\sharename". To mount a file system in a Unix® system, the user may issue a command "mount blah.com:/share/misc/local".

Figure 5:
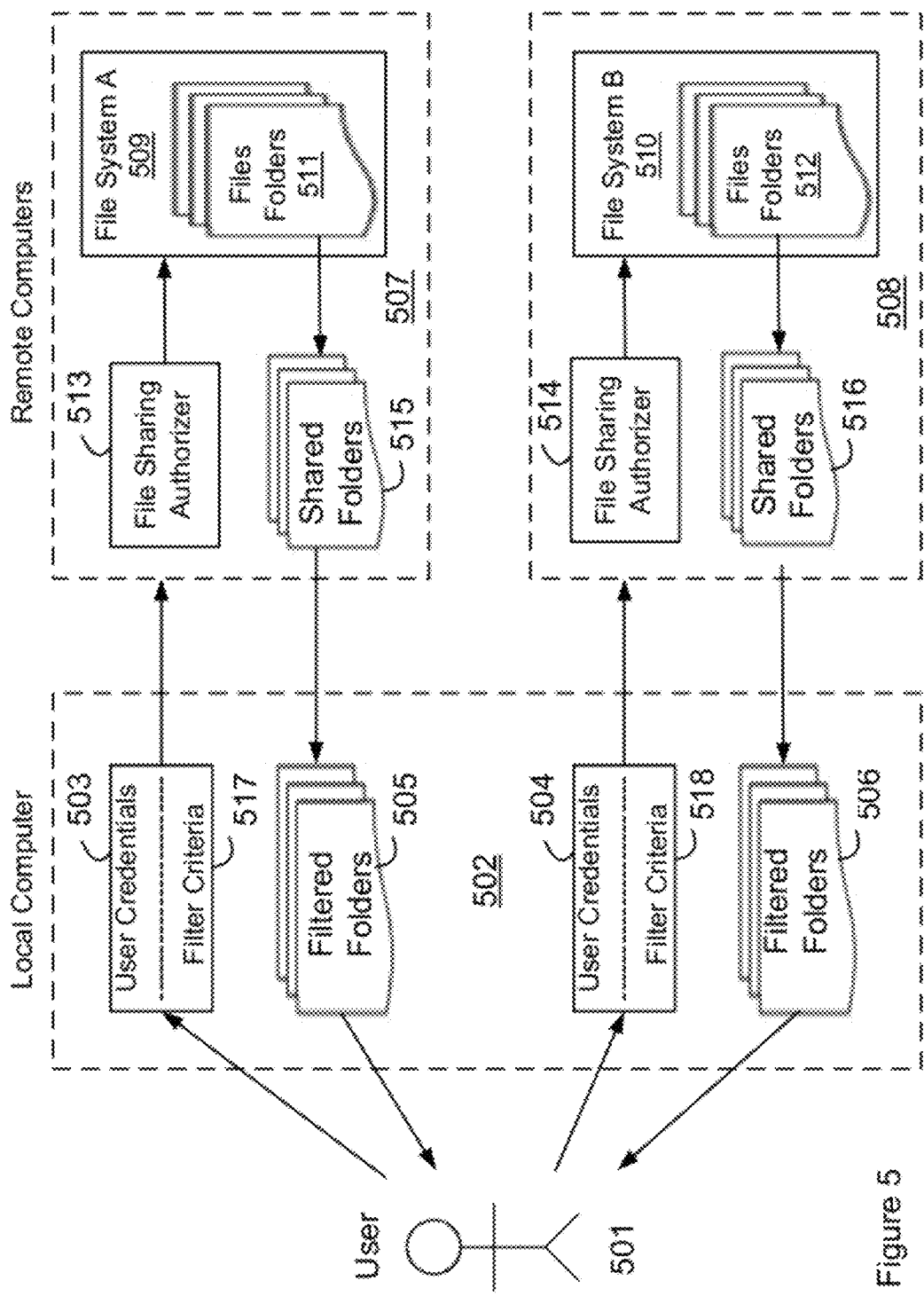
FIG. 5 illustrates a block diagram of drive mappings between a local computer system and multiple remote file sharing systems according to an exemplary embodiment.

FIG. 5 illustrates a block diagram of a file sharing environment comprising a local computer and multiple remote file systems, according to an exemplary embodiment. As an example, user 501 may be using a local computer 502 to access multiple file systems 509-510 that respectively operate in remote computers 507-508. In order to access the file systems 509-510, the user 501 may need to log into the remote computers 507-508 and be authorized by the respective file sharing authorizing components 513-514. The login may involve providing appropriate user security credentials to the remote computers 507-508, which may comprise user ID and password pairs.

File sharing authorizing components 513-514 are security features in the operating systems of the remote computers 507-508 that examine the user's credentials to determine whether to grant the user access to certain files or folders in the respective file systems 509-510. For example, the file sharing authorizing component 513 may determine that the user 501 has "read" access to five shared folders 515 of the ten folders 511 in the file sharing system 509. Subsequently, only these five folders 515 may be allowed to map to the user's local computer 502, and the user may decide to map any one, two, or all of the five folders 515, or a subfolder of any allowed folders 515 to the user's local system. A file sharing authorizing component 513-514 may be a combination of file sharing permission and login credential authorization. In addition, the file sharing permission components 513-514 may decide the level of file access that the user would have for a particular file or folder, such as the user's authority to read, write, or update a file or a folder.

In the above example, any user change to a mapped file in the user's local system cannot be propagated to the file sharing system because of the "read only" permission. The file sharing authorizing components 513-514 may determine whether a logged-in user has the file access privileges that user has requested. In the example, if the user requests to map a file that is not in any of the five folders that the user has read permission, then the remote file sharing system would deny the request. The file sharing permission is generally configured when files and folders are shared. For example, in a Windows™ operating system, a user may right-click a directory under the "Windows Explorer" menu, then "Sharing and Security", and select the "Security" tab to set up file sharing permission.

Once authorized to access the file systems 509-510, the user 501 may specify one or more filtering criteria 517-518 for each of the respective file sharing systems 509-510. The user 501 may configure the filtering criteria 517-518 at the local computer 502 to be respectively applied at the remote file systems 509-510. The filters 517-518 may be in the form of regular expressions. A regular expression is a pattern that describes how the matching should be done and contains desired criteria such as uppercase or lowercase, character ranges, and character positions. An example of a regular expression is: ^[A-Za-z_]*$, which indicates a match on the English letters, underscores, and spaces. Another example of a regular expression is [0-9]{3}\-?[0-9]{2}\-?[0-9]{4}, which indicates a match on a US social security number in the forms of 123-45-6789 and 123456789.

The filters 517-518 may be in other forms of expressions that are agreed upon between user and the shared file systems. For instance, the user may use the filter expression "after01102010" to specify that only the files created or updated after Jan. 10, 2010 are to be mapped. The filters 517-518 may be a combination of the two expressions above. For example, the user may specify the filter "name: ^[A-Za-z_]*$, metadata: after01102010" to indicate that only files created or updated after Jan. 10, 2010, and whose names contain English letters, underscores, and spaces are to be mapped.

Further, the filters 517-518 may be configured to apply to folder and file names, file contents or both. The remote file sharing systems 509-510 respectively apply the filtering criteria 517-518 to file systems 509-510 and only return the files or file folders 505-506 in the file systems 509-510 that satisfy the filtering criteria 517-518 to be mapped to a local drive in the user's computer 502. In the above example, after the content filter 517 is applied, only two file folders 505 of the five folders 515 that the user has "read" permission in the file sharing system 516 would be mapped to the user's local computer 502.

The filtering criteria 517-518 may apply to the names and contents of files and folders, as well as file attributes and metadata such as file owner information, file access rights, file mode, file creation date, file update times and dates, revision information, attributes relating to operation systems, and other file metadata. The following examples illustrate some content filtering criteria 517-518 that may be used in an embodiment of the invention.

Metadata filter: after 01-10-2010
Name filter: ^[A-Z a-z_]*$
Content filter: [0-9]{3}\-?[0-9]{2}\-?[0-9]{4}

The metadata filter allows files that are created or updated after Jan. 10, 2010 to be mapped to a local file structure. The name filter allows file and directory names that contain only English letters, underscores, and spaces to be mapped to a local file structure. The content filter allows only the files that contain a US social security number in the form of 123-45-6789 and 123456789 to be mapped to the local file structure.

Figure 6:
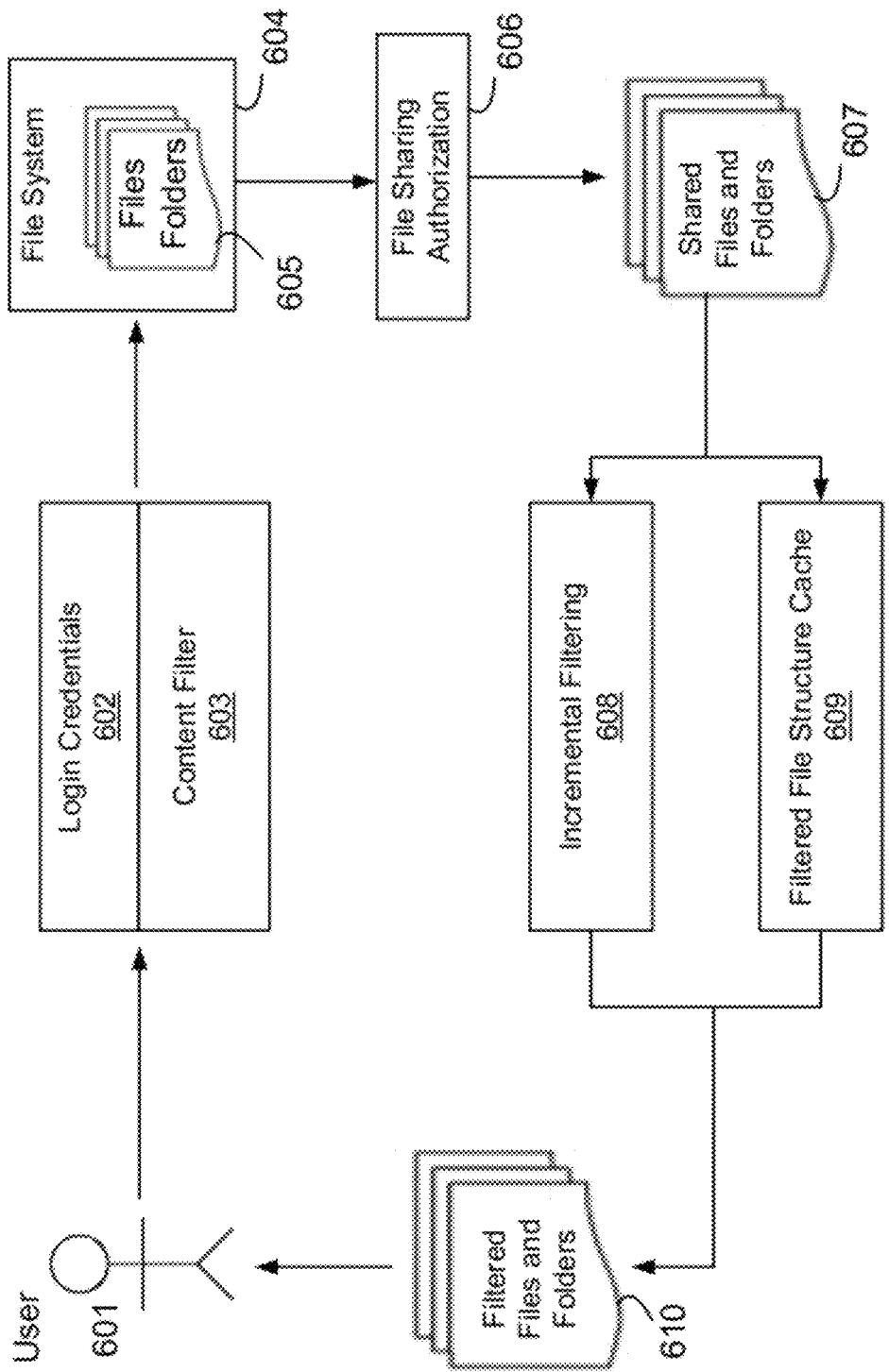
FIG. 6 illustrates an exemplary drive mapping configuration that supports cached filtering and incremental filtering of the files and folders in a remote file system, according to an embodiment of the invention.

FIG. 6 illustrates another embodiment of a file sharing system that uses a content filter cache to further improve file sharing response time. The embodiment in FIG. 6 further illustrates a caching of the filtering criteria and filtered files and folders for better system performance. In order to access files 605 in a remote file system 604, a user 601 may provide login credentials 602 to the remote computer (not shown) that hosts the remote file system 604. The credentials may be supplied when the user 601 initiates an operation to map the remote file system 604 to a local drive.

The user 601 may further specify a set of filtering criteria 603 as described above with reference to FIG. 5 to be applied to the shared files and folders. File sharing authorization component 606, which may be part of the file sharing system 604 or the remote computer hosting the file system 604, may grant user 601 access to the files and folders 605 based on the login credentials 602. The user 601 may then access shared files 607 along with other file users who are authorized by the remote computer to access the shared files 607.

In the illustrated embodiment, the remote file sharing system 604 may further apply filtering criteria 603 to the shared files and folders 607 and identify only those that satisfy the filtering criteria 603. The filtered files and folders are sent to the user 601 as filtered files and folders 610, which are mapped to a local drive in the user's computer. The filtering criteria 603 and references to the resulting file names of the matched files and folders, such as directory paths to the files and folders, may be stored in a cache memory 609 of the remote file sharing system or a network component connecting the local and remote computers. The remote file sharing system may use the cached filtering criteria and cached file-filtering results for future drive map requests from the same user or other users to improve file sharing performance.

For any new drive map request with a filtering criterion, if the criterion in the request exists in the cache 609, then the mapped files in the cache 609 that relate to the criterion may be returned to the user. If the criterion in the request is a combination of two or more criteria in the cache 609, then the combined files for these two or more file criteria in the cache 609 may be returned to the user. If the criterion in the request is a super set of a criterion or criterion combination in the cache 609, then a differential criterion may be used to search remote file system 604 to find the corresponding files, and the differential criterion and the files found may be cached, and the combined file system results from the cache 609 and from the search may be returned.

For example, if a user's request specifies a content filter: ^[A-Za-z_]*$ for identifying the English alphabets, underscores, and spaces in a file name, then the remote file sharing system may examine the cache 609 to identify the files whose file names contain the English capital letters, underscores, and spaces in their file names. The shared file system may further determine that the filter criterion ^[A-Za-z_]*$ in the request is a super set of a previous filter criterion ^[A-Z_]*$ in the cache 609. In that case, the remote file sharing system may to search the remote file system 604 for relevant files and folders using a differential filter criterion ^[a-z_]*$. The files and folders resulting from the filtering using the differential filter criterion ^[a-z_]*$ may be combined with previous results in the cache 609 for the filter ^[A-Z_]*$ and returned to the user. The differential criterion ^[a-z_]*$ and the files and folders resulting from the filtering using this criterion may further be cached to respond to future content filtering requests.

The content filter cache just described may improve the file sharing performance considerably as the amount of time needed for matching the files and folders against the filter criteria is greatly reduced.

The exemplary file sharing system illustrated in FIG. 6 may further comprise an incremental filtering component 608 for updating the content filter cache and minimizing the amount of data in the remote file sharing system 604 to be filtered during file mapping and thus further improving system performance. As contents in the remote file sharing system 604 change, such as file data, file names, and file structure metadata, the filtered files 610 and cached information in the filter cache 609 may become obsolete. The incremental filtering component 608 may perform a partial filtering by applying the filtering criteria 603 only against the files, folders, or and organization metadata in the remote file system 604 that have changed since the last filtering, rather than against the entire file system.

An incremental filtering may be performed whenever a file change is detected or periodically at certain time intervals to update the affected cache entries in the remote file sharing system, independent of mapping requests. Thus, this incremental filtering may significantly reduce the amount of data to be filtered at the remote file system during subsequent file mapping requests and further improve file sharing performance.

Figure 7:
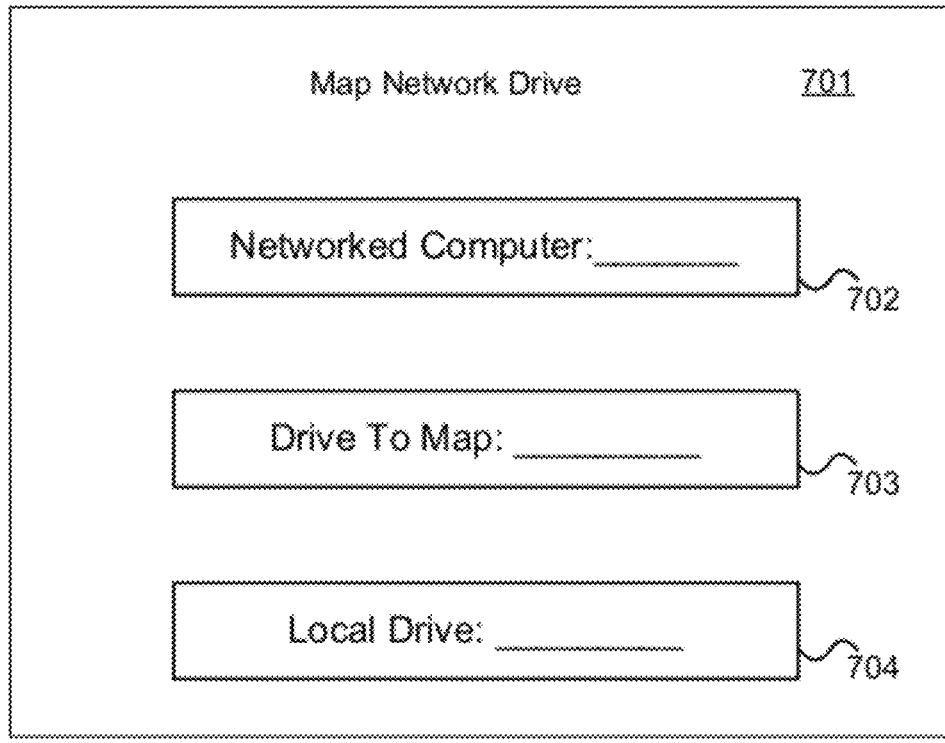
FIG. 7 illustrates an exemplary user interface for specifying a remote file structure to be mapped for file sharing, according to an embodiment of the invention.

A user may initiate a drive map with file filtering criteria though a user interface provided at the local computer. FIG. 7 illustrates an example of a drive map user menu. Drive map user menu 701 may comprise a "Networked Computer" field 702 for the name of the remote computer hosting the files that the user is interested in, and a "Drive To Map" field for the remote drive to be mapped. The user menu 701 may further include a "Local Drive" field 703 for the user to enter a local drive identifier for the mapped drive.

Figure 8:
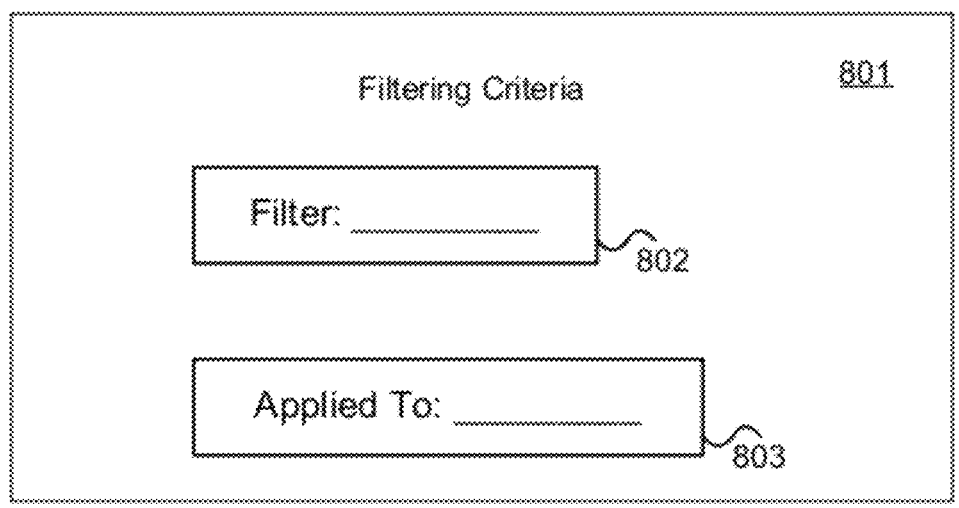
FIG. 8 illustrates an exemplary user interface for specifying a filtering criterion to be applied to target files and folders in a remote file system, according an embodiment of the invention.

FIG. 8 illustrates a user menu on which the user may specify the criteria to be used for filtering contents of a remote file structure in a drive map. The filter user menu 801 may include a "Filter" field 801 for entering the file filtering criteria, and an "Applied To" field 802 for specifying file structures, metadata, contents, folders, or files that the criteria are to be applied to. In the "Filter" field 801, the user may specify a regular expression or other expressions to be applied against the remote files. For example, a filter of ^[A-Za-z_]*$ may be used for mapping only the files with the file names containing English alphabets, spaces and underscores. In the "Applied To" field 802, the user may enter the type of data to be filtered, such as file name, folder name, directory name, file contents, file update information, and other metadata on the remote file system.

A user may specify a filter criterion through a command. A component in the user's local computer may provide a new command or modify an existing command to accept a content filter optional parameter. For example, in Windows™ systems, the user may issue the command "net use z: \\blah\sharename-filter "^[A-Za-z_]*$"". In Unix® and Linux® systems, the user may issue the command "mount blah.com:/share/misc/local-filter "^[A-Za-z_]*$")". (Linux is a registered trademark of Linus Torvalds in the United States, other countries, or both.)

Figure 9:
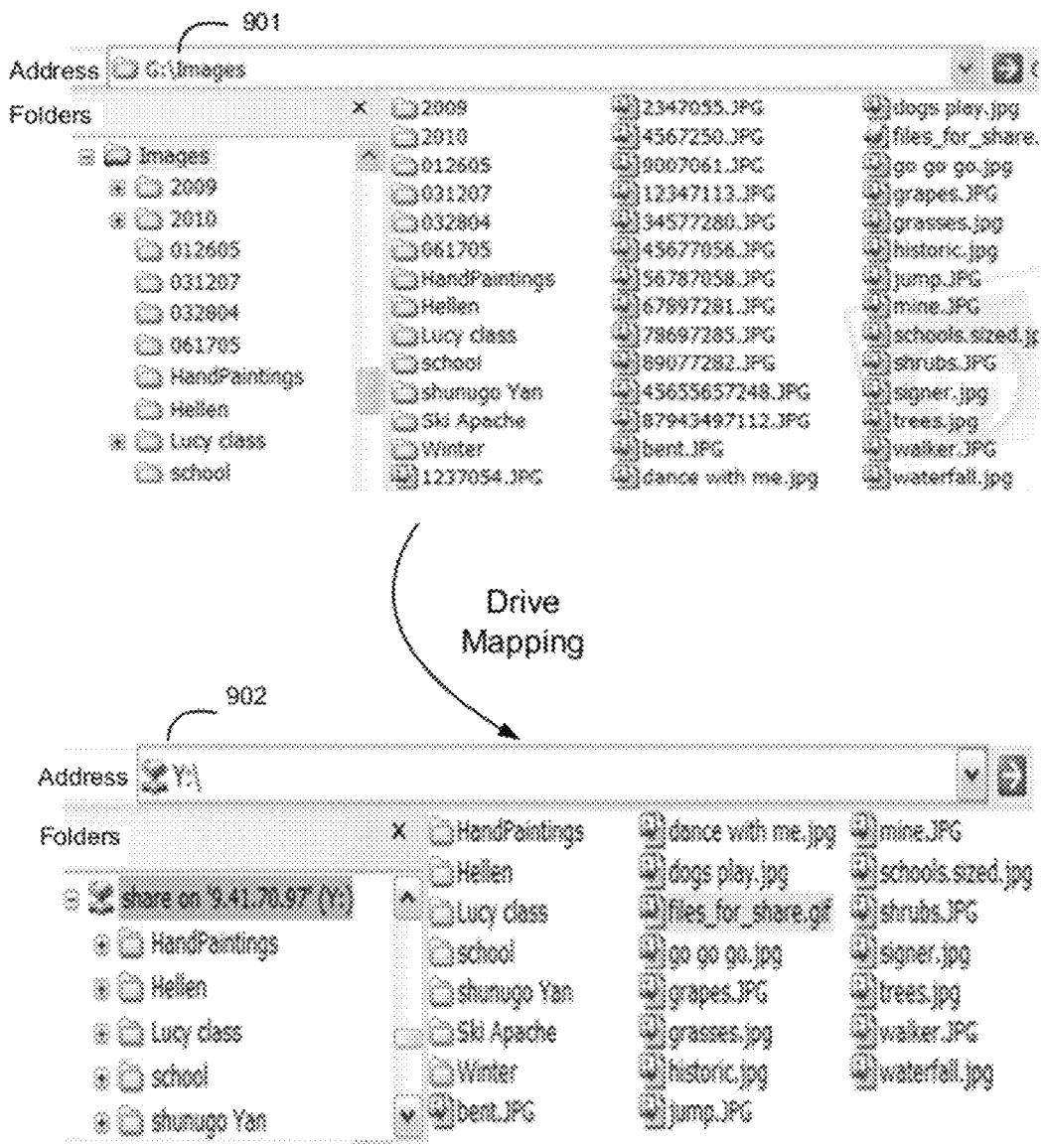
FIG. 9 illustrates an example of a content-filtered drive mapping according an embodiment of the invention.

FIG. 9 illustrates an example of a content-filter drive mapping according to an embodiment of the invention. File structure 901 comprises files and folders in a remote file system that have names containing both letters and numbers. In a drive map operation, the user may be interested only in the files and folders that include letters in their names, but not numbers. By applying the user's filtering criteria of ^[A-Za-z_]*$ to the file and folder names in file structure 901, the remote computer returns the set of filtered files and folders in mapped drive Y (902).

Figure 10:
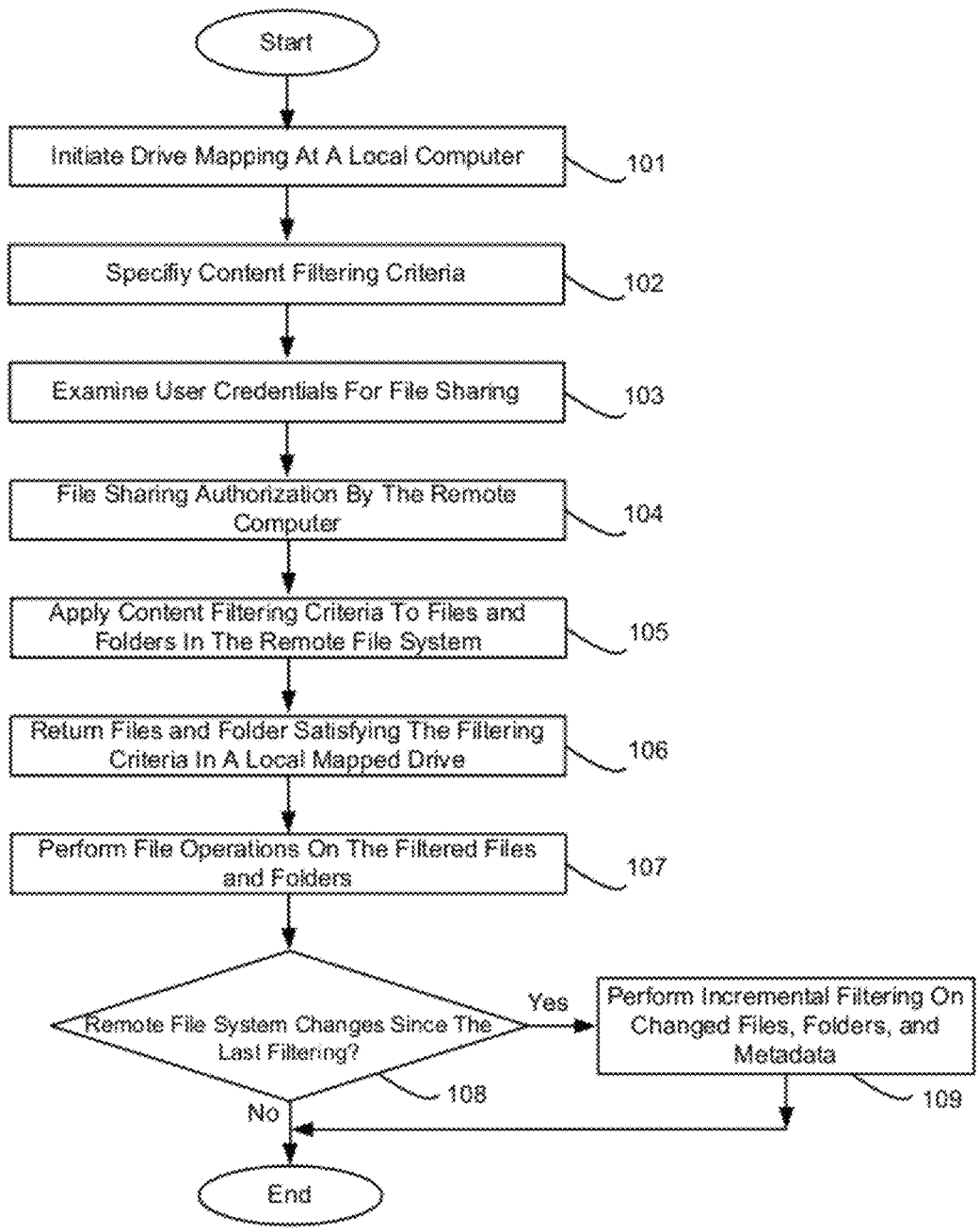
FIG. 10 is a flow chart of a process for mapping a remote file structure to a local drive based on content filtering, according to an exemplary embodiment of the invention.

FIG. 10 is a flow chart of a process for mapping a remote file structure to a local drive based on content filtering in accordance with an exemplary embodiment. The sequence of operations as shown is just one example and not intended to be limiting on the order of the operations that may be implemented. The process starts with the user initiating a drive mapping at step 101. Through a filtering user interface such as the user interface illustrated in FIG. 8, the user may specify desired content filtering criteria at step 102. The remote file sharing system may examine user credentials, per step 103, to determine whether the user has the required credentials to access the remote file system. If the user has access rights to the file system, then the remote file sharing system may grant the user file sharing privileges for the requested mapping, per step 104. With the authorized file sharing, the user may access all files and folders in the requested mapping directory of the remote file system, if desired.

At step 105, the remote file sharing system applies user-specified filtering criteria to the shared files and folders to identify those that meet the criteria. The remote file sharing system then returns the identified files and folders to the user in step 106. The user may then perform file operations on the returned files and folders such as opening, copying, and editing the files at the local computer, at step 107.

In order to reduce the amount of data to be filtered, the remote file sharing system may identify the files, folders, their contents, or file system metadata that have changed since the last filtering, at step 108. The filtering criteria and results of the last filtering operation may be in the cache 609 as described above with reference to FIG. 6. The remote file sharing system may perform an incremental filtering on the changed contents in the file system, per step 109, to update the content filter cache. At a later time, the same user or another user may desire to map the same remote file structure again. The remote file sharing system may return the filtered files and folders to the user. Such a content filter, content filter cache and incremental filtering together improve system performance as they reduce the amount of remote file data to be filtered and transmitted across the network connecting the local and remote computers.

Figure 11:
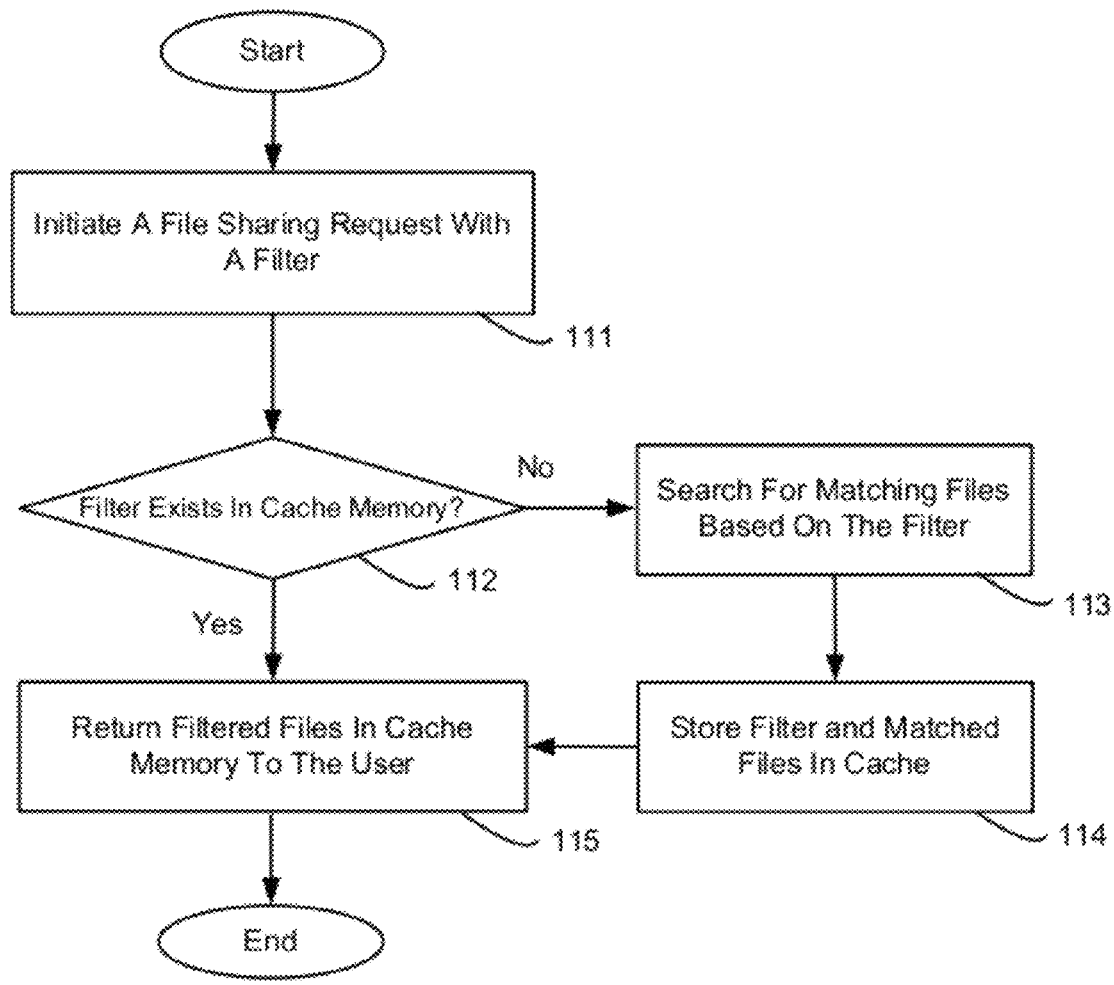
FIG. 11 is a flow chart illustrating a process for filtering files and folders in a remote file system with a filter cache, according to an exemplary embodiment of the invention.

FIG. 11 illustrates a flow chart of an exemplary process for incrementally filtering files and folders of a remote file sharing system based on a set of user criteria, according to an embodiment of the invention. The process begins at step 111 with the user initiating a file sharing request that includes a filter to be applied against the files and folders of the remote file sharing system. The remote file sharing system may examine the cache 609 to determine whether the requested filter and filtered results may be in the cache 609, at step 112. If the user's requested filter and filtering results are in the cache 609, then the remote file sharing system returns the files and folders currently in the cache 609 that have been identified in a previous filtering using the same cached filter, at step 115. If the requested filtering is not in the cache 609, then the remote file sharing system applies the requested filter criteria against the remote file structure to identify files and folders that match the filter, at step 113. The remote file sharing system may store the matching files and folders in the cache 609, at step 114, and return the matching files and folders to the user, at step 115.

The subject matter described above is provided by way of illustration only and should not be construed as limiting. Various modifications and substitutions of the described components and operations can be made by those skilled in the art without departing from the spirit and scope of the invention defined in the following claims, the scope of which is to be accorded the broadest interpretation so as to encompass such modifications and equivalent structures. The systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the invention may be embodied as a method, system or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or the connection may be made to an external computer, for example, through the Internet using an Internet Service Provider.

Aspects of the invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
   a remote file structure residing on a remote drive storing a plurality of files;
   a local file structure operating at a local computer coupled to the remote file structure by
   a network, wherein the local file structure resides at a local drive;
   a file sharing authorizer for receiving user credentials;

a user interface, at the local computer, for specifying a user-specified filtering criterion to access the files of the remote file structure as shared files; and a logic component configured to only map the files in the remote drive to the local drive that meet the user-specified criterion in a form of a regular expression, wherein the mapping is based on the user credentials, wherein the mapped files meet the user-specified filtering criterion and are used for subsequent file operations at the local file structure, wherein the user-specified filtering criterion comprises at least one user filter for selecting files of the remote drive as the shared files of said mapping of the drives, and wherein the regular expression is a pattern that describes how matching is to be performed and comprises a character range and a character position.

2. The system of claim 1, further comprising:
a logic component for configuring the user-specified filtering criterion at the local computer; and
a logic component configured to apply the filtering criterion to the remote file structure.

3. The system of claim 1, further comprising a cache coupled to the network for storing the user-specified filtering criterion for the drive mapping and
information on the mapped files of the remote drive to the local drive.

4. The system of claim 1, further comprising an incremental filtering component to map the files in the remote drive that have changed since the last mapping based on the filtering criterion applied to the drive mapping.

5. The system of claim 1, wherein the local drive is a logical drive in the local computer.

6. The system of claim 1, wherein the remote file structure is a shared file structure.

7. The system of claim 1, wherein the user-specified filtering criterion relates to file contents and file metadata.

8. A computer program product for accessing a remote file system comprising a computer readable non-transitory storage medium having computer readable program code embodied therewith, the computer readable program code comprising
computer readable program code configured to:
receive user credentials;
provide a user interface for specifying a user-specified filtering criterion at a local computer to map a remote drive storing the files of the remote file system to a local drive, as
shared files;
authorize user access to the remote file system based on the user credentials; and
only map files in the remote drive to the local drive operating at the local computer that meet the user-specified filtering criterion in a form of a regular expression,
wherein the local computer is coupled to the remote file system by a network,
wherein the mapped files meet the user-specified filtering criterion and are used in subsequent file operations at the local file system,
wherein the user-specified filtering criterion comprises at least one user filter for selecting files of the remote drive, as the shared files of said mapping of the drives, and
wherein the regular expression is a pattern that describes how matching is to be performed and comprises a character range and a character position.

9. The computer program product of claim 8, further comprising computer readable program code configured to store the user-specified filtering criterion and information on the mapped files in a cache coupled to the network.

10. The computer program product of claim 9, further comprising computer readable program code configured to incrementally update the cache based on changes in the remote file system.

11. The computer program product of claim 8, wherein the files are remapped to the local drive in response to a change in the user-specified filtering criterion.

12. The computer program product of claim 8, wherein the user-specified filtering criterion relates to file contents and file metadata.

13. A computer implemented method for accessing a remote file system, comprising:
receiving user credentials;
providing a user interface for specifying a user-specified filtering criterion at a local computer to map a remote drive storing the files of the remote file system to a local drive, as
shared files;
authorizing user access to the remote file system based on the user credentials; and
only mapping the files in the remote drive to a local drive operating at the local computer that meet the user-specified criterion in an form of a regular expression,
wherein the local computer is coupled to the remote file system by a network,
wherein the mapped files meet the filtering criterion and are used in subsequent file operations at the local file system,
wherein the user-specified filtering criterion comprises at least one user filter for selecting files of the remote drive, as the shared files of said mapping of the drives, and
wherein the regular expression is a pattern that describes how matching is to be performed and comprises a character range and a character position.

14. The method of claim 13, wherein the user-specified filtering criterion is configured at the local computer and applied at the remote file system.

15. The method of claim 13, wherein the user-specified filtering criterion and information on the mapped files are stored in a cache coupled to the network.

16. The method of claim 15, wherein the cache is incrementally updated based on changes in the remote file system.

17. The method of claim 13, wherein the files are remapped to the local drive in response to a change in the user-specified filtering criterion for the drive mapping.

18. The method of claim 13, wherein the user-specified filtering criterion relates to file contents and file metadata and wherein the user-specified filtering criterion comprises a field identifying at least one folder stored on the remote drive to which the user-specified filtering criterion is to be applied.

19. The system of claim 1, wherein the user-specified filtering criterion specifies type of data to be filtered during the mapping of the files stored on the remote drive to the local drive.

20. The system of claim 4, wherein the incremental filtering component only updates the files in the remote drive that have changed and wherein incremental filtering by the incremental filtering component is independent of the drive mapping.

21. The system of claim 1, wherein the user interface comprises:
at least one field for a user inputting information about the local drive to map to in the local computer and for a user inputting information about the remote drive in a remote computer which is to be mapped to the local drive, at least one field for a user specifying a filter from the at least one filter for selecting files of the remote drive as the shared files of said mapping of the drives, wherein the filter is applied to at least one of directories present on the remote drive such that only files compliant with the filter are mapped to the local drive, and wherein the local drive stores a shared directory comprising only a portion of the files stored in the directory of the remote drive.

22. The system of claim 1, wherein the user-specified filtering criterion comprises at least one of a date and alphanumeric characters that are to be applied to file names of the plurality of files stored at least in a portion of the remote drive and wherein the user-specified filtering criterion is applied to the plurality of files and at least two files are displayed at the local file structure.

* * * * *